United States Patent
Nishiyama (10) Patent No.: US 10,116,917 B2
(45) Date of Patent: Oct. 30, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomohiro Nishiyama, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 15/208,037

(22) Filed: Jul. 12, 2016

(65) Prior Publication Data

US 2017/0019654 A1    Jan. 19, 2017

(30) Foreign Application Priority Data

Jul. 15, 2015  (JP) .................................. 2015-141363

(51) Int. Cl.
| | |
|---|---|
| H04N 13/128 | (2018.01) |
| H04N 13/15 | (2018.01) |
| G06T 5/00 | (2006.01) |
| H04N 13/106 | (2018.01) |
| H04N 13/00 | (2018.01) |

(52) U.S. Cl.
CPC ........... *H04N 13/128* (2018.05); *G06T 5/002* (2013.01); *H04N 13/106* (2018.05); *H04N 13/15* (2018.05); *G06T 2207/10012* (2013.01); *G06T 2207/10024* (2013.01); *G06T 2207/10028* (2013.01); *G06T 2207/20192* (2013.01); *H04N 2013/0077* (2013.01); *H04N 2013/0081* (2013.01)

(58) Field of Classification Search
CPC ............................. H04N 19/17; H04N 13/128
USPC .......................................................... 348/154
See application file for complete search history.

(56) References Cited

U.S. PATENT DOCUMENTS

| | | | |
|---|---|---|---|
| 8,253,733 B2 * | 8/2012 | Kim .................. | H04N 13/0011 345/419 |
| 9,094,657 B2 * | 7/2015 | Oshikiri ................ | H04N 13/00 |
| 2013/0076873 A1 * | 3/2013 | Oshikiri ................ | H04N 13/00 348/51 |
| 2014/0093159 A1 * | 4/2014 | Nguyen .................. | G06T 5/002 382/154 |
| 2016/0035069 A1 * | 2/2016 | Min ........................ | G06T 5/007 382/266 |
| 2016/0301908 A1 * | 10/2016 | Itakura ............... | H04N 13/0011 |
| 2017/0163997 A1 * | 6/2017 | Haruna ............... | H04N 19/167 |
| 2017/0295355 A1 * | 10/2017 | Tanaka ............... | H04N 13/0022 |

* cited by examiner

*Primary Examiner* — Paulos M Natnael
(74) *Attorney, Agent, or Firm* — Carter, DeLuca, Farrell & Schmidt, LLP (57) ABSTRACT

In filter processing of a disparity map and a depth map, a disparity estimation accuracy is improved while maintaining the edge of a subject. An image processing apparatus that corrects a depth image representing information about a depth to a subject in a scene, which is the same scene of a plurality of images obtained by photographing the same subject from different viewpoints. The image processing apparatus includes: an evaluation value derivation unit configured to derive a matching evaluation value between the plurality of images; a weight determination unit configured to determine a weight in the correction based on the evaluation value; and a correction unit configured to correct a pixel value in the depth image by using the weight.

9 Claims, 8 Drawing Sheets

IMAGE PROCESSING APPARATUS, IMAGE PROCESSING METHOD, AND STORAGE MEDIUM

BACKGROUND OF THE INVENTION

Field of the Invention

The present invention relates to a technique to correct a disparity map and a depth map.

Description of the Related Art

As the method of correcting a loss of data, a non-uniform error, a pixel value with a low reliability, etc., in a depth map that represents a distance (depth) to a subject by a pixel value, there is filter processing using a smoothing filter. However, the smoothing filter is a filter that reduces the difference in pixel value between a pixel of interest and a peripheral pixel. Because of this, there is such a problem that the boundary portion (edge) of a subject is blurred due to the filter processing. Consequently, as the method of smoothing an image without losing information on an edge, an edge-saving type smoothing filter has been proposed. U.S. Pat. No. 8,253,733 has disclosed the Cross (or Joint) Bilateral Filter (CBF) as an example of the edge-saving type smoothing filter. The Cross Bilateral Filter is a filter that determines a weight to be used for filter processing for each pixel based on the similarity of the luminance value in each pixel of a reference image by preparing an image with a higher image quality (reference image) corresponding to the same scene of an image to be corrected (input image). The Cross Bilateral Filter determines the weight to be used for filter processing based on the reference image that shows a clearer edge than that of the input image, and therefore, it is possible to obtain an image with a clearer edge than that in the case where the weight is determined by using only the input image. Then, by determining the weight to be used for filter processing for each pixel based on the similarity of the luminance value in each pixel of the reference image, it is possible to reduce contribution of pixels corresponding to a different subject, and therefore, it is possible to obtain an image with a clearer edge.

However, with the technique described in U.S. Pat. No. 8,253,733, there is a case where an area occurs where the boundary portion (edge) between subjects whose luminance values are close to each other is blurred. Further, in the scene where the depth value changes continuously also within one and the same subject, there is a possibility that the accuracy of the depth value is reduced due to smoothing. This problem similarly applies not only to the above-described depth map representing the depth to the subject but also to the disparity map representing the distribution of the disparity amount in the entire image from an arbitrary viewpoint. Consequently, an object of the present invention is to improve disparity estimation accuracy while maintaining the edge of a subject in the filter processing of the disparity map and the depth map.

SUMMARY OF THE INVENTION

The image processing apparatus according to the present invention is an image processing apparatus that corrects a depth image representing information about a depth to a subject in a scene, which is the same scene of a plurality of images obtained by photographing the same subject from different viewpoints, and includes an evaluation value derivation unit configured to derive a matching evaluation value between the plurality of images, a weight determination unit configured to determine a weight in the correction based on the evaluation value, and a correction unit configured to correct a pixel value in the depth image by using the weight.

Further features of the present invention will become apparent from the following description of exemplary embodiments (with reference to the attached drawings).

DESCRIPTION OF THE EMBODIMENTS

[First Embodiment]

In the present embodiment, the case where a disparity map (monochrome image) is corrected by filter processing is described. Weight coefficients that are used for filter processing are determined by a correspondence relationship between a plurality of images having disparity obtained by photographing one and the same subject from different viewpoints.

Here, definition of terms in the present specification is checked. In the present specification, a "depth map" refers to an image that represents a distance (depth) to a subject by a pixel value and a "disparity map" refers to an image that represents an amount of movement (disparity) of a subject between a plurality of images by a pixel value. An inverse of a disparity that is multiplied by a constant corresponds to a depth (distance) to the subject, and therefore, both images have common characteristics in representing information about a depth to a subject in one and the same scene. Consequently, as a term that represents a superordinate concept of the disparity map and the depth map, a "depth image" is used. It is possible to obtain the above-described constant by which the inverse of a disparity is multiplied by finding the product of the interval between the cameras that perform photographing from a plurality of viewpoints and the focal length (units of pixel).

In the following, the case is explained as an example where the disparity map is corrected by using two images in which a disparity occurs in the horizontal direction. However, as will be described later, the number of images to be used may be three or more and further, it is also possible to apply the present embodiment even in the case where a disparity occurs in any direction other than the horizontal direction. Furthermore, as described above, the depth map and the disparity map have common characteristics in being images representing information about a depth to a subject and are interconvertible, and therefore, it is also possible to apply the explanation to the case of the depth map as in the case of the disparity map.

Figure 1:
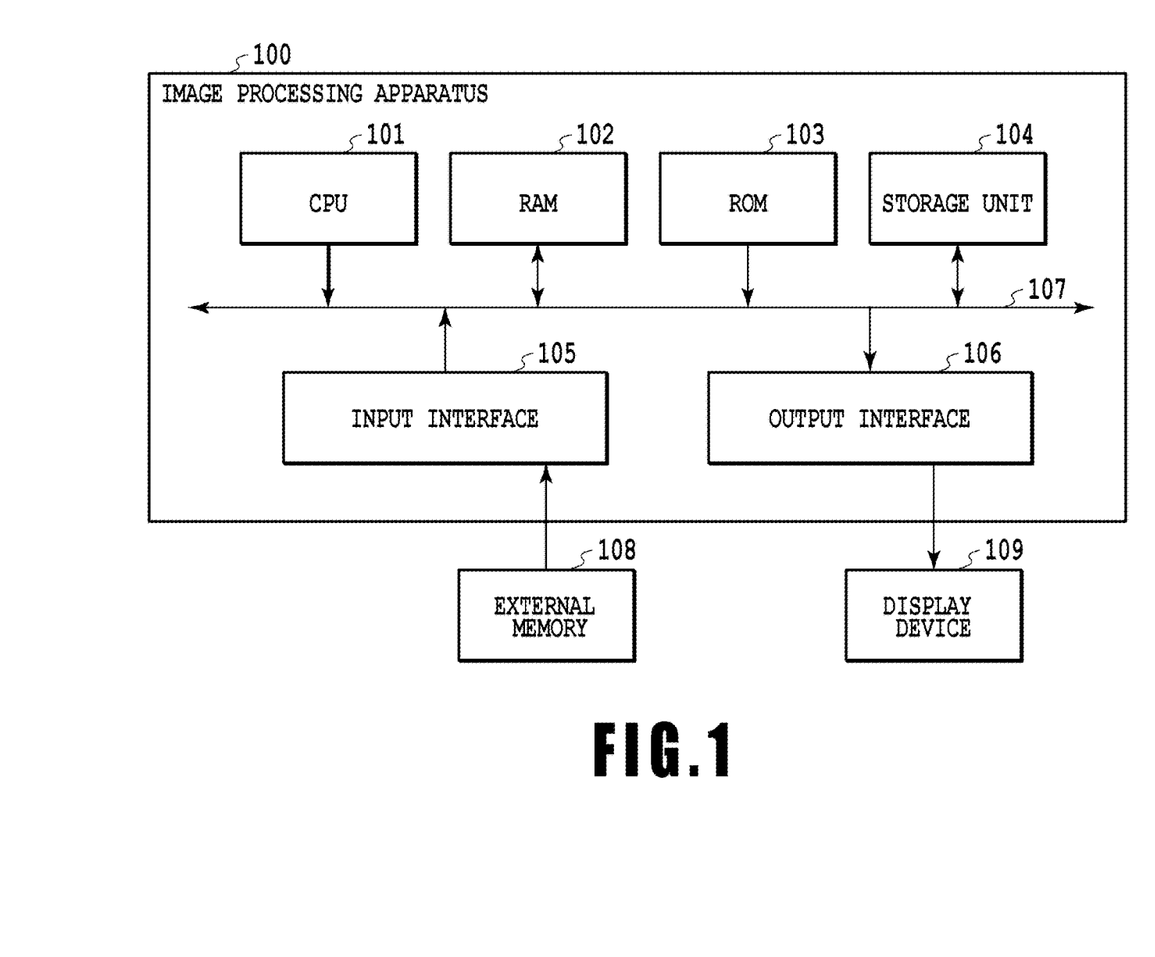
FIG. 1 is a diagram showing a hardware configuration of an image processing apparatus.

FIG. 1 is a diagram showing a hardware configuration of an image processing apparatus according to the present embodiment.

An image processing apparatus 100 includes a CPU 101, a RAM 102, a ROM 103, a storage unit 104, an input interface 105, and an output interface 106 and these units are connected to one another via a system bus 107. Then, to the input interface 105, an external memory 108 is connected and to the output interface 106, a display device 109 is connected.

The CPU 101 is a processor that centralizedly controls each unit described above in the image processing apparatus 100. The RAM 102 is a memory that functions as a main memory and a work area of the CPU 101. Then, the ROM 103 is a memory that stores programs or the like that are used for various kinds of processing. The CPU 101 performs various kinds of processing, to be described later, by executing programs stored in the ROM 103 by using the RAM 102 as a work area. The storage unit 104 is a storage device that stores image data that is used for each piece of processing, parameters for each piece of processing, etc. As the storage unit 104, an HDD, an optical disk drive, a flash memory, etc., are used.

The input interface 105 is, for example, a serial bus interface, such as USB and IEEE1394. It is possible for the image processing apparatus 100 to acquire image data or the like of the processing target from the external memory 108 (e.g., a hard disc, a memory card, a CF card, an SD card, a USB memory) via the input interface 105. The output interface 106 is a video output terminal, for example, such as DVI and HDMI (registered trademark). It is possible for the image processing apparatus 100 to output image data processed by the image processing apparatus 100 to the display device 109 (image display device, such as a liquid crystal display) via the output interface 106. There exist components in the image processing apparatus 100 other than those described above, but they are not the chief object of the present invention, and therefore, explanation thereof is omitted.

Figure 2:
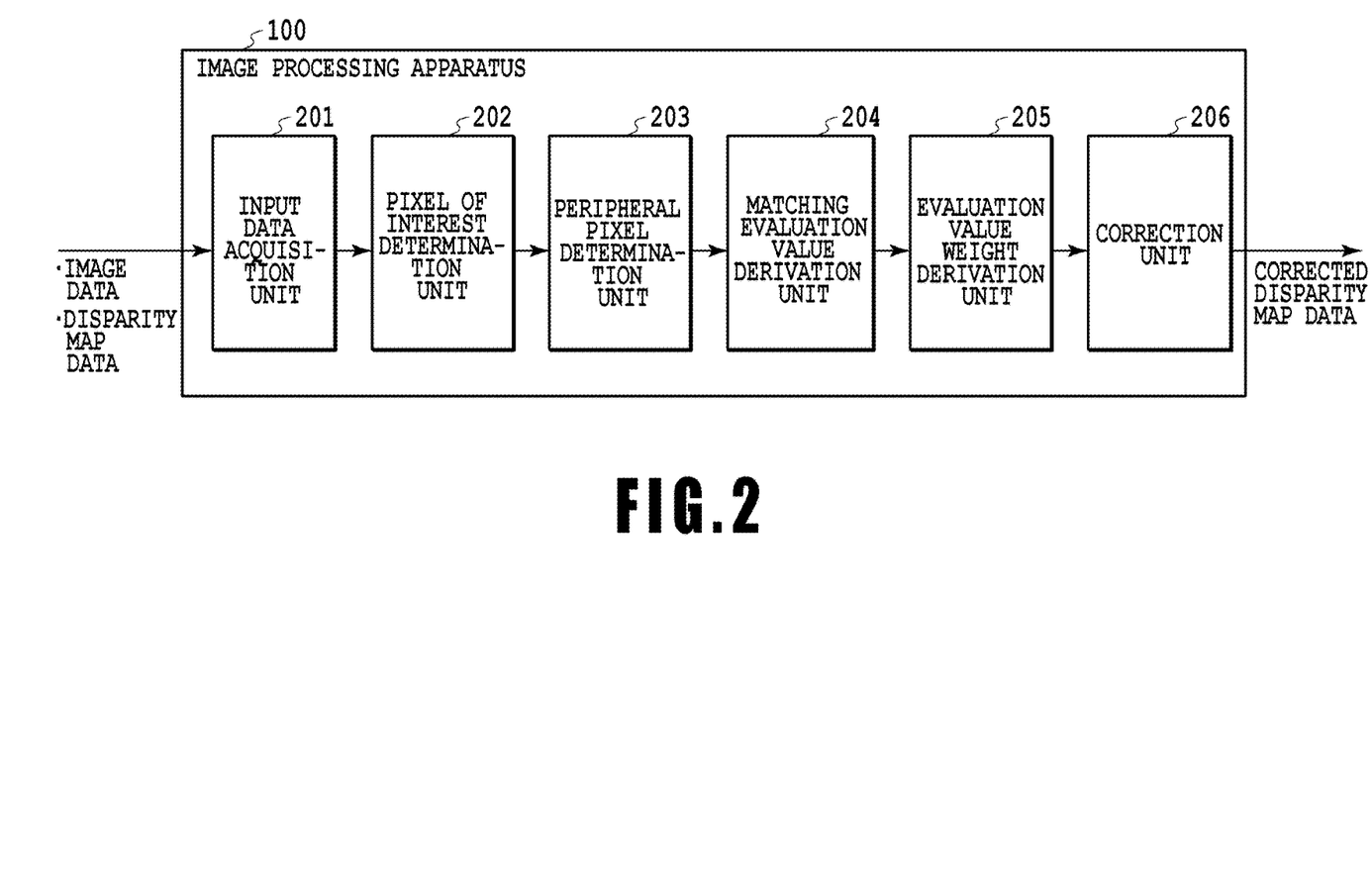
FIG. 2 is a function block diagram showing a software configuration of an image processing apparatus according to a first embodiment.

FIG. 2 is a function block diagram showing a software configuration of the image processing apparatus 100 according to the present embodiment.

The image processing apparatus 100 includes an input data acquisition unit 201, a pixel of interest determination unit 202, a peripheral pixel determination unit 203, a matching evaluation value derivation unit 204, an evaluation value weight derivation unit 205, and a correction unit 206. Hereinafter, an outline of each unit is explained.

The input data acquisition unit 201 acquires data of a plurality of images and a disparity map that estimates disparity between the plurality of images from the external memory 108 or the like via the input interface 105. Here, the disparity map is monochrome image data. In the disparity map, a value representing an amount of movement (disparity) of a subject between a plurality of images that are input is represented by one of a pixel values of 0 to 255 (the range is adjusted by, for example, in the case where the value representing the maximum disparity is 30, multiplying 30 by 8 so that the maximum value becomes 240). The disparity map is obtained by, for example, the stereo method or DFD (Depth From Defocus) using a plurality of pieces of image data including reference image data. It may also be possible to generate the disparity map by converting depth information obtained by the active method, such as a method that uses a TOF (Time of Flight) sensor, into disparity information. The acquired data of the plurality of images and the disparity map are sent to the pixel of interest determination unit 202.

The pixel of interest determination unit 202 determines a pixel of interest on which filter processing is to be performed based on coordinate information indicating the position of the pixel of interest.

The peripheral pixel determination unit 203 determines a pixel, for which a weight that is used in the filter processing is derived, based on the coordinate information indicating the position of the pixel of interest and the coordinate information indicating a relative position from the pixel of interest.

The matching evaluation value derivation unit 204 derives an evaluation value (value representing similarity in the pixel value between corresponding pixels in a plurality of images) representing a degree of matching between a plurality of images that are input.

The evaluation value weight derivation unit 205 derives a weight that is used in the filter processing for each pixel based on the derived matching evaluation value.

The correction unit 206 corrects the pixel value (disparity value) of the input disparity map by the filter processing using the weight derived by the evaluation value weight derivation unit 205 and generates a new disparity map.

Figure 3:
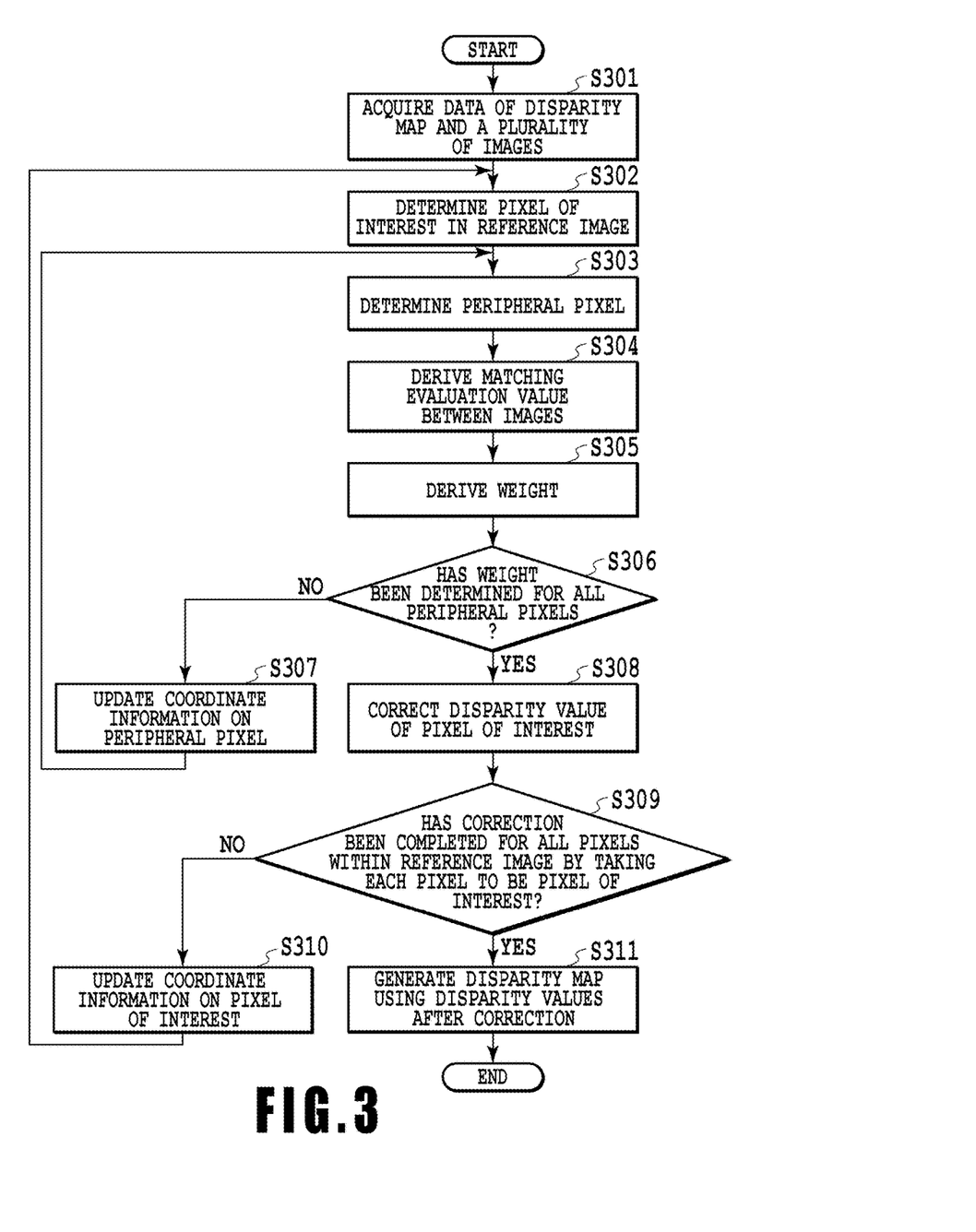
FIG. 3 is a flowchart showing a flow of correction processing of disparity map data according to the first embodiment.

FIG. 3 is a flowchart showing a flow of correction processing of disparity map data according to the present embodiment. The series of processing is implemented by the CPU 101 executing a program stored in the ROM 103 after loading the program into the RAM 102.

Figure 4:
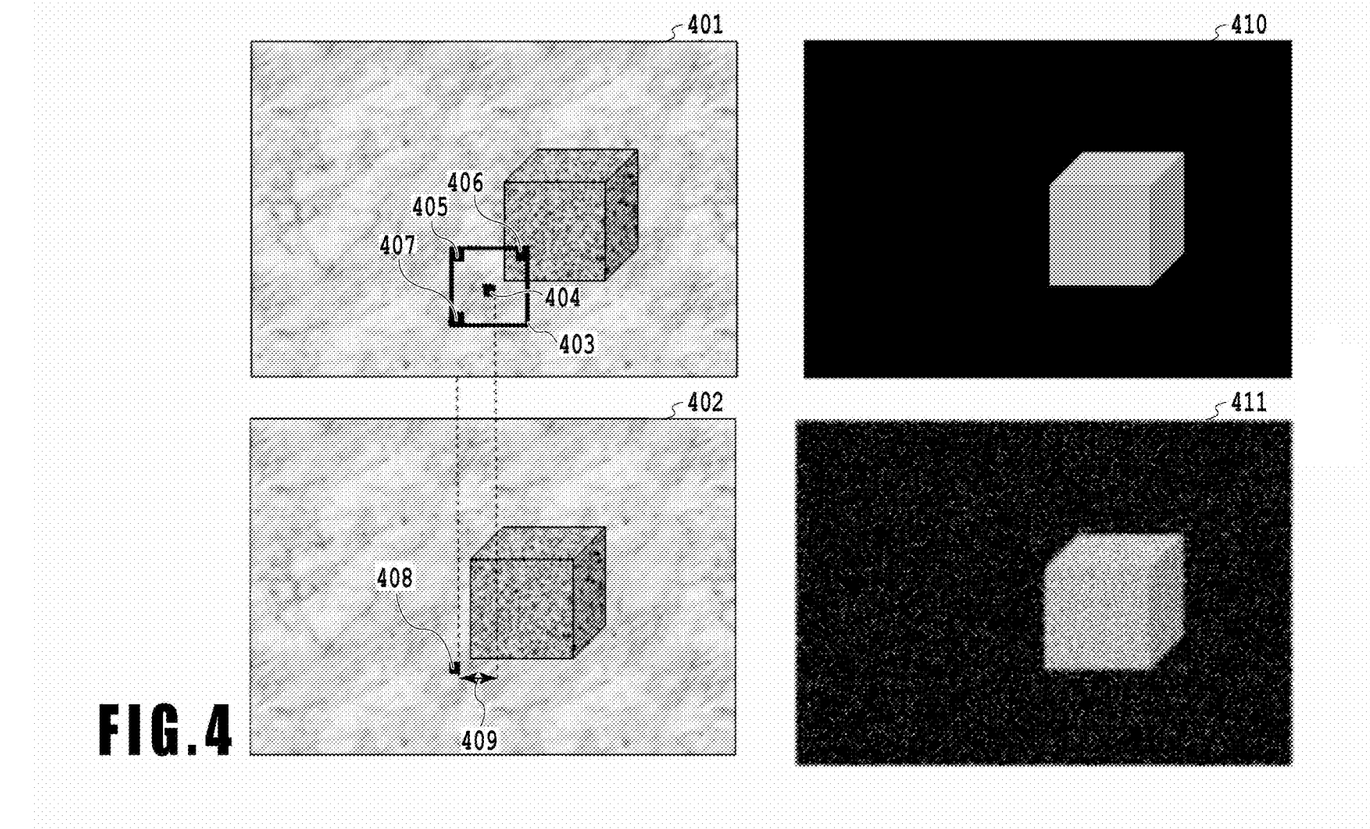
FIG. 4 is a diagram showing examples of the input images and disparity maps.

At step 301, the input data acquisition unit 201 acquires the image data and the disparity map data from the external memory 103 via the input interface 105 and outputs the data to the pixel of interest determination unit 202. FIG. 4 is a diagram showing examples of two images obtained by photographing a subject (cube) from viewpoints different in the horizontal direction and disparity maps corresponding to the images. Here, it is assumed that two images 401 and 402 shown in FIG. 4 are input as images. In FIG. 4, a disparity map 411, which is unclear on the whole, indicates the disparity map (estimated disparity map) that is input at this step, and a clear disparity map 410 indicates a disparity map that is ideal (ground truth of disparity map), which does not exist actually.

In the following explanation, among a plurality of images (here, the images 401 and 402), the image that is photographed from the viewpoint from which a user desires to view the subject is defined as a "reference image" and it is assumed that the image 401 is the reference image.

Further, it is assumed that the disparity map 411 is an image representing the estimated disparity in the case where the subject is viewed from the same viewpoint as that of the reference image, and in the following, the filter processing is performed on the disparity map 411.

At step 302, the pixel of interest determination unit 202 determines a pixel of interest p based on the coordinate information indicating the position of the pixel of interest in the reference image. The coordinate information is stored in the RAM 102. In the initial state immediately after the start of the processing, in the RAM 102, as the initial values of the coordinates of the pixel of interest p, (0, 0) indicating the position of the upper-left corner of the image is stored. Then, in the case where the pixel of interest p is determined, the pixel value of the pixel of interest p and the pixel values of eight adjacent pixels included in a block of 3×3 pixels therearound are stored in the RAM 102. Here, it is assumed that a pixel 404 is determined as the pixel of interest p. Examples of pixel values that are stored in the RAM in this case are shown below.

$$\frac{1}{255}\begin{pmatrix} 201 & 180 & 185 \\ 190 & 210 & 195 \\ 182 & 202 & 193 \end{pmatrix}$$

In the above-described specific example, the pixel value of the pixel 404 as the pixel of interest p is 210/255 (the range that the pixel value can take is normalized to a range between 0 and 1). The eight adjacent pixels surrounding the pixel of interest p represent a pixel group that is used in the case where an evaluation value is calculated by using expression (2), to be described later. In the present embodiment, the range of the pixel group is taken to be the block of 3×3 pixels around the pixel of interest, but the block size is not limited to this.

At step 303, the peripheral pixel determination unit 203 determines a pixel r (hereinafter, peripheral pixel r) located on the periphery of the pixel of interest p, for which a weight in the filter processing is to be derived, based on the coordinate information on the pixel of interest p and the coordinate information indicating the relative position relationship from the pixel of interest p. The coordinate information here is also stored in the RAM 102. Then, the coordinates of the determined peripheral pixel r and the information on the disparity value corresponding to the peripheral pixel r are stored in the RAM 102. In the present embodiment, it is assumed that a pixel is used in the filter processing, which is located within a predetermined block (here, within a block of 11×11 pixels) with the pixel of interest p as a center. Consequently, in the present embodiment, the peripheral pixel r is determined sequentially from the pixels within the block of 11×11 pixels with the pixel of interest p as a center. In the initial state immediately after the start of processing, as the coordinate information indicating the relative position relationship from the pixel of interest p, the coordinate values (−5, −5) indicating the position of the upper-left corner in the above-described block in the case where the coordinates of the pixel of interest p are taken to be (0, 0) are stored in the RAM 102. In the case where the pixel 404 in the image 401 indicates the pixel of interest p and a frame 403 indicates the block of 11×11 pixels, the coordinate values (−5, −5) are coordinate values indicating a pixel 405 in the upper-left corner of the frame 403. Then, as the disparity value of the pixel 405 in the upper-left corner, for example, a value such as 3 pixel is acquired from the input disparity map (here, the disparity map 411) by referring to the coordinate information on the peripheral pixel r and is stored in the RAM 102. Similarly, in the case where the coordinate values of the peripheral pixel r are, for example, (5, −5), the coordinate values (5, −5) are coordinate values indicating a pixel 406 in the upper-right corner of the frame 403. In other words, as the disparity value of the pixel 406, for example, a value such as 12 pixel is acquired from the input disparity map 411 by referring to the coordinate information on the peripheral pixel r and is stored in the RAM 102.

At step 304, the matching evaluation value derivation unit 204 refers to a pixel value (=disparity value d (r)) in the input disparity map and the pixel value in the input images in the pixel position specified by the coordinate information based on the coordinate information on the peripheral pixel r stored in the RAM 102. From these pixel values that are referred to, a matching evaluation value between the input images is derived. Here, the number of images that are input is two, i.e., the images 401 and 402, and therefore, in the case where the two images 401 and 402 are taken to be $I_1$ and $I_2$, respectively, an evaluation value V (p, r) that is to be found is expressed by expression (1) below.

$$V(p,r)=f(I_1(p),I_2(p-d(r)v)) \qquad \text{Expression (1)}$$

In expression (1) described above, p and r are two-dimensional vectors corresponding to the coordinates of the pixel of interest p and the peripheral pixel r, respectively, and v is a direction vector representing the relative position (direction) of a camera. In the case where two cameras are put side by side horizontally, the direction vector v of the position of the camera that photographs $I_2$ is (1, 0) by taking $I_1$ to be the reference image of interest and taking the position of the camera that photographs $I_1$ to be the origin. Then, d (r) represents the disparity value at the coordinates of the peripheral pixel r of the disparity map 411 and f ( ) is a function to evaluate matching between the input images, i.e., similarity, and it is possible to use, for example, SSD (Sum of Squared Differences), ZNCC (Zero-mean Normalized Cross-Correlation), etc. In the present embodiment, the case of SSD that spans the range of 3×3 pixels with the pixel of interest as a center is explained. At this time, expression (1) described above becomes expression (2) as below.

$$V(p, r) = \frac{1}{9}\sum_{s\in B}[I_1(p+s) - I_2(p+s-vd(r))]^2 \qquad \text{Expression (2)}$$

In expression (2) described above, B represents a set of 3×3 pixels with the pixel of interest as a center and it is assumed that Σ means calculation of the sum of nine pixels included in the set B. As described above, it is assumed that the pixel value of the input images is normalized to a value between 0 and 1 in the present embodiment. By expression (2) described above, a value such as √V (p, r)=0.05 is found as a matching evaluation value (in order to make the value easy-to-see, the value is represented by a square root). The number of pixels that are used to derive the matching evaluation value may be any number, and for example, B in expression (2) described above may be a set of 4×4 pixels and 16 pixels may be used, or it may also be possible to use only the pixel of interest. Further, the shape of the set B does not need to be a square.

At step 305, the evaluation value weight derivation unit 205 derives a weight w of the peripheral pixel r determined at step 303 based on the evaluation value V (p, r) derived at step 304. The weight w is found by, for example, using expression (3) below.

$$w(p, r) = \exp\left\{-\frac{V(p, r)}{2\sigma^2}\right\} \qquad \text{Expression (3)}$$

In expression (3) described above, σ is a real constant that can be set arbitrarily and is a constant indicating the range of the evaluation value that should be taken into consideration. In general, there is a tendency for the image after the correction to be blurred as σ increases. In the present embodiment, σ is set to 0.1 (σ=0.1) but this value can be set freely. For example, in the case where the square root of the evaluation value √V (p, r)=0.05 and σ=0.1, the weight w that is found by expression (3) described above will be w (p, r)=0.8825. The weight w does not necessarily need to be derived by the operation using expression (3) described above. For example, it may also be possible to prepare a table in which the evaluation value and the weight are associated with each other and to find a weight in accordance with the input evaluation value by using the table. An example of the table is shown below.

TABLE 1

| Evaluation value √V (p, r): Value of square root of expression (2) | Weight w (p, r) |
|---|---|
| Not less than 0 and not more than 0.1 | 0.9 |
| Not less than 0.1 and not more than 0.2 | 0.7 |
| Not less than 0.2 and not more than 0.3 | 0.5 |
| Not less than 0.3 and not more than 0.4 | 0.2 |
| Not less than 0.4 and not more than 0.5 | 0.1 |
| 0.5 or more | 0 |

At step 306, the correction unit 206 determines whether the weight w has been determined for all the pixels within the predetermined block (here, 11×11 pixels) that defines the range of the peripheral pixel r. In the case where the peripheral pixel r for which the weight w has not been determined yet exists, the processing proceeds to step 307. On the other hand, in the case where the weight w has been determined for all the peripheral pixels r within the predetermined block, the processing proceeds to step 308. In the example in FIG. 4, in the stage where the processing proceeds to step 308, the weight w has already been determined for all the pixels in the range of 11×11 pixels shown by the frame 403 in the case where the pixel of interest p is taken to be the pixel 404. As an example, the weight w (p, r) of the pixel 404 that is the pixel of interest w(p,r)=1.00, the weight w (p, r) of the pixel 406 in the upper-right corner that is the peripheral pixel w(p,r)=0.08, the weight w (p, r) of the pixel 407 in the lower-left corner that is also the peripheral pixel w(p,r)=0.87, and so on. In the present embodiment, the range of 11×11 pixels with the pixel of interest as a center is taken to be the range of the peripheral pixels that are used for the correction processing, but the range is not limited to this. For example, it may also be possible to take all the pixels within the input images to be the range of the peripheral pixels that are used for the correction processing, or to change the peripheral pixel r that is used in accordance with the value of the derived weight.

At step 307, the correction unit 206 updates the coordinate information indicating the position of the peripheral pixel r (relative position from the pixel of interest p). For example, in the case where the current coordinate values are (−5, −5) of the initial state immediately after the start of processing, the next coordinate values are updated to (−4, −5) indicating the right-hand neighbor of (−5, −5). In the case where the current coordinate values are (5, −5) and the right end of the block of 11×11 pixels shown by the frame 403 is reached, the next coordinate values are updated to (−5, −4). In the case where the coordinate information specifying the position of the next peripheral pixel r is updated, the next peripheral pixel r is determined at step 303 and the processing is continued.

At step 308, the correction unit 206 corrects the disparity value corresponding to the pixel of interest p based on the weights of the pixel of interest p and the peripheral pixel r and the disparity value corresponding to the peripheral pixel r, which are stored in the RAM 102. A disparity value D (p) after the correction with respect to the pixel of interest p is expressed by expression (4) below.

$$D(p) = \frac{\sum_r w(p, r)d(r)}{\sum_r w(p, r)} \qquad \text{Expression (4)}$$

In expression (4) described above, d (r) is the pixel value (disparity value) on the input disparity map corresponding to the peripheral pixel r as described above. By substituting the value of the weight w of each peripheral pixel r that is output from the evaluation value weight derivation unit 205 and the disparity value corresponding to each peripheral pixel r that is stored in the RAM 102 in expression (4) described above, the disparity value D (p) after the correction with respect to the pixel of interest p is found. As will be described later, in the case where the disparity value before the correction corresponding to the pixel 404 as the pixel of interest p is 3 pixel, the disparity value is corrected to a value, for example, 1.2 pixel, which is closer to the true value.

At step 309, the correction unit 206 determines whether the correction of the disparity value of the input disparity map has been completed for all the pixels within the reference image (here, the image 401) by taking each pixel to be the pixel of interest p. In the case where there is a pixel on which the processing has not been performed yet, the processing proceeds to step 310. On the other hand, in the case where the correction of the disparity value of the input disparity map has been completed for all the pixels by taking each pixel to be the pixel of interest p, the processing proceeds to step 311.

At step 310, the correction unit 206 returns the coordinate information indicating the position of the peripheral pixel r to (−5, −5), which is the initial values, as well as updating the coordinate information indicating the position of the pixel of interest p. Then, after the updating of the coordinate information is performed, the processing returns to step 302 and the next pixel of interest p is determined, and then the processing is continued.

At step 311, the correction unit 206 generates and outputs a disparity map based on the corrected disparity values.

The above is the contents of the processing to correct the disparity map data according to the present embodiment.

≤Principle of the Present Embodiment>

Here, the principle of the correction processing according to the present embodiment is explained.

In FIG. 4, the image 401 of the two images constituting the input images is a left-viewpoint image and the image 402 is a right-viewpoint image. Then, the disparity map 410 is the ground truth of disparity map and the disparity map 411 is the estimated disparity map of these input images. The frame 403 in the image 401 indicates the range of the peripheral pixel r with the pixel 404 as the pixel of interest p as a center and the pixels 405 and 406 and a pixel 407 indicate each pixel in the upper-left corner, in the upper-right corner, and in the lower-left corner of the peripheral pixels. The disparity maps 410 and 411 indicate that the higher the luminance, the larger the disparity is and that the disparity is larger in the cube that is the subject located ahead of the other. Here, it is assumed that the disparity value corresponding to the pixel 406 in the ground truth of disparity map 410 is 10 pixel and the disparity value corresponding to the pixel 404 and the pixel 407 is 1 pixel. Further, it is also assumed that the disparity value corresponding to the pixel 406 in the estimated disparity map 411 is 12 pixel and the disparity value of the pixel of interest 404 and the pixel 407 is 2 pixel.

In the present embodiment, in the case where the weight of the pixel 406 as the peripheral pixel r is derived, the disparity value=12 pixel corresponding to the pixel 406 in the estimated disparity map 411 is referred to. Then, by shifting the pixel of interest 404 by 12 pixel, a corresponding pixel 408 in the right-viewpoint image 402 is found. A bidirectional arrow 409 in the right-viewpoint image 402 indicates the amount of movement corresponding to 12 pixel. Then, by using expression (2) described previously, the matching evaluation value between the pixel of interest 404 and the corresponding pixel 408 is derived. At this time, the ground truth of disparity value in the pixel of interest 404 is 1 pixel and the deviation is large, and therefore, the evaluation value to be derived becomes large and as a result of this, the weight becomes small.

On the other hand, in the case where the weight of the pixel 407 as the peripheral pixel r is derived, the disparity value=2 pixel corresponding to the pixel 407 in the estimated disparity map 411 is referred to. Then, by shifting the pixel of interest 404 by 2 pixel, a corresponding pixel (not shown) in the right-viewpoint image 402 is found. At this time, the ground truth of disparity value in the pixel of interest 404 is 1 pixel and the deviation is small, and therefore, the evaluation value to be derived becomes small and as a result of this, the weight becomes large.

As described above, in the estimated disparity map 411, a peripheral pixel having a disparity value closer to the ground truth of disparity value has a greater influence on correction. As a result of this, it is made possible to reduce noise and to perform filling the holes in the estimated disparity map 411 while maintaining a disparity estimation accuracy of the subject boundary and each pixel.

<Effects of the Present Embodiment>

Figure 5:
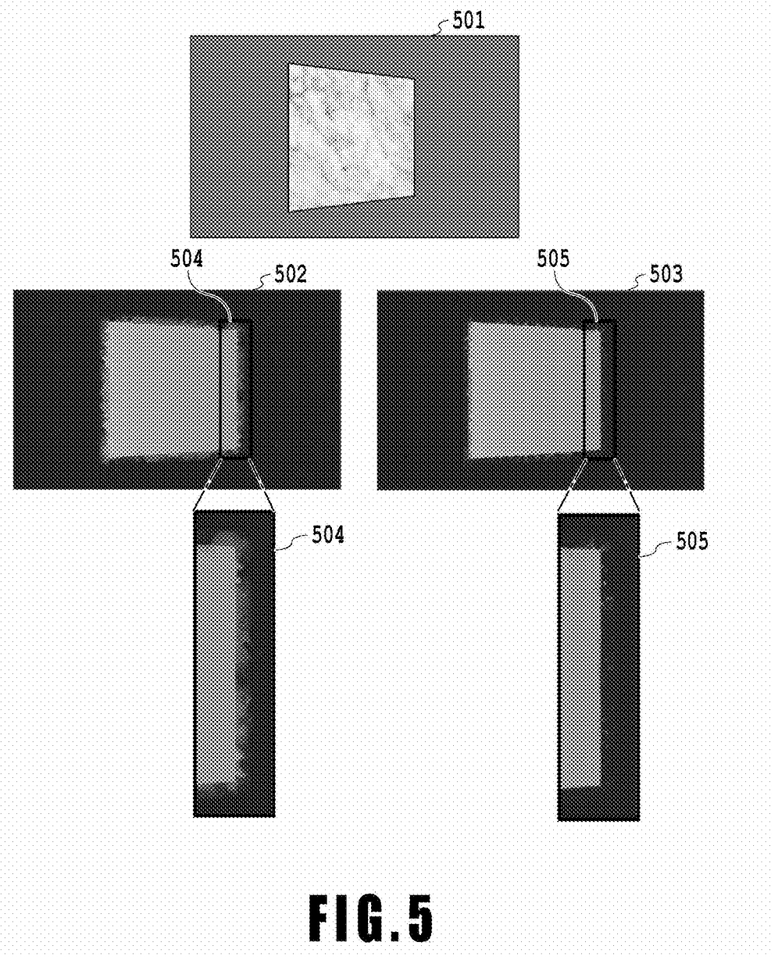
FIG. 5 is a diagram showing effects of correction processing according to the first embodiment.

FIG. 5 is a diagram showing the effects of the correction processing according to the present embodiment. An image 501 is one of input images, which is obtained by photographing a scene in which a plate is arranged obliquely. A disparity map 502 shows the results of correcting the estimated disparity map (not shown) of the image 501 by using a bilateral filter and a disparity map 503 shows the results of correcting the estimated disparity map of the image 501 by using the method according to the present embodiment. Enlarged diagrams 504 and 505 are enlarged diagrams obtained by cutting out the subject boundary portion from the disparity maps 502 and 503 after the correction, respectively. It is known that the subject boundary portion (edge) obtained by the method according to the present embodiment is clearer and the correction is performed in a more desirable manner.

In the present embodiment, explanation is given by taking the case where two cameras are arranged side by side in the horizontal direction as an example, but the case is not limited to this example. For example, a case may be accepted where five cameras are arranged so as to form the shape of a cross. In this case, on a condition that the numbers of the cameras arranged to the left of, to the right of, above, and under the central camera are taken to be 2, 3, 4, and 5, respectively, with the position of the central camera being taken to be the origin, each direction vector v is $v_2=(-1, 0)$, $v_3=(1, 0)$, $v_4=(0, 1)$, and $v_5=(0, -1)$.

At this time, expression (1) to find an evaluation value described previously becomes expression (1)' as below.

$$V(p, r) = f(I_1(p), I_2(p - d(r)v_2), \qquad \text{Expression (1)'}$$
$$I_3(p - d(r)v_3), I_4(p - d(r)v_4), I_5(p - d(r)v_5))$$

$$V_j(p, r) = \frac{1}{9}\sum_{s \in B}[I_1(p+s) - I_j(p+s - v_j d(r))]^2 \qquad \text{Expression (2)'}$$

As a result of this, the evaluation value corresponding to expression (2) described previously becomes, for example, an expression as below by using expression (2)' described above.

$$V(p, r) = \sum_{j=2}^{5} V_j(p, r)$$

$$V(p, r) = \min_{2 \le j \le 5}\{V_j(p, r)\}$$

As above, according to the present embodiment, it is possible to correct depth images with a high accuracy, such as a disparity map and a depth map obtained from a plurality of pieces of disparity image data. In detail, it is made possible to implement filter processing that maintains the definition of the edge in a subject boundary portion and the accuracy of the depth value.

[Second Embodiment]

Next, an aspect is explained as a second embodiment, which supposes a case where all the values of the weights of peripheral pixels become small unless countermeasures are taken because matching is not attained between images in an occlusion area or the like. Explanation of the portions in common to those of the first embodiment is omitted or simplified and in the following, different points are explained mainly.

Figure 6:
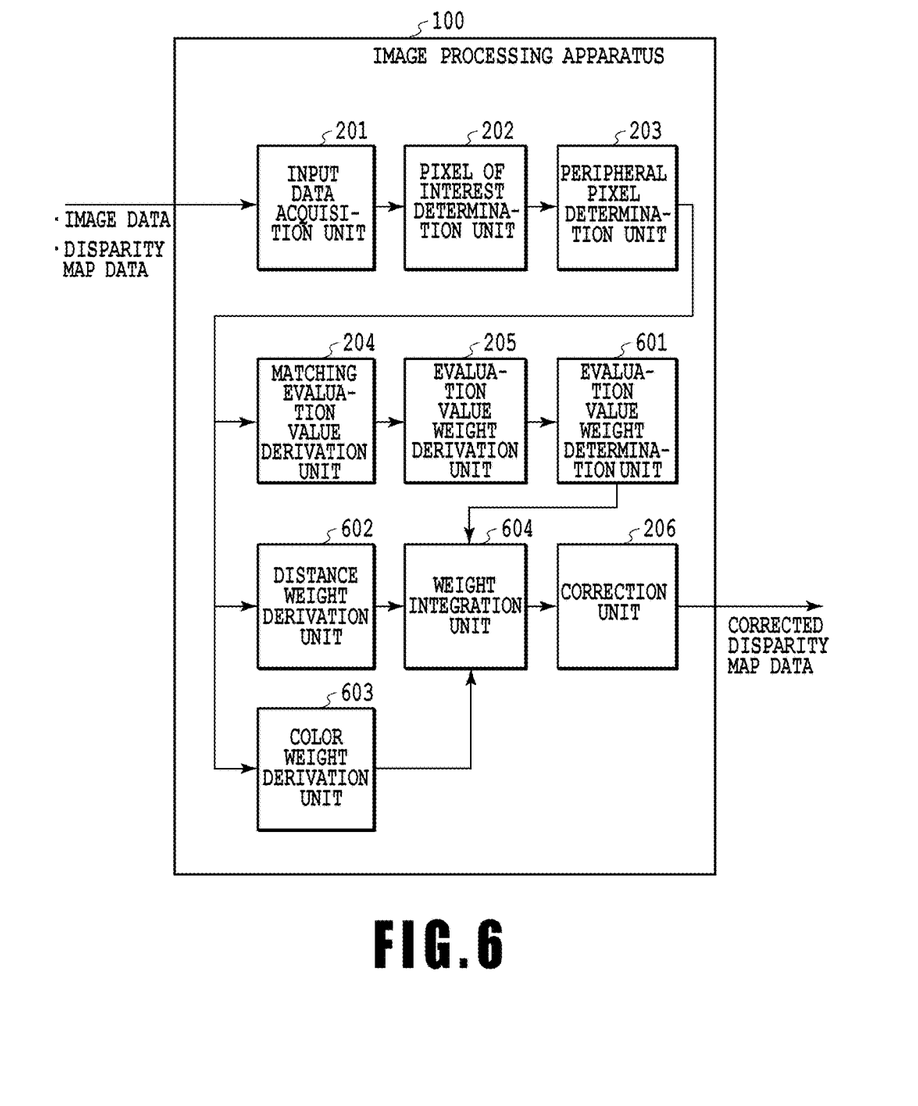
FIG. 6 is a function block diagram showing a software configuration of an image processing apparatus according to a second embodiment.
Figure 7:
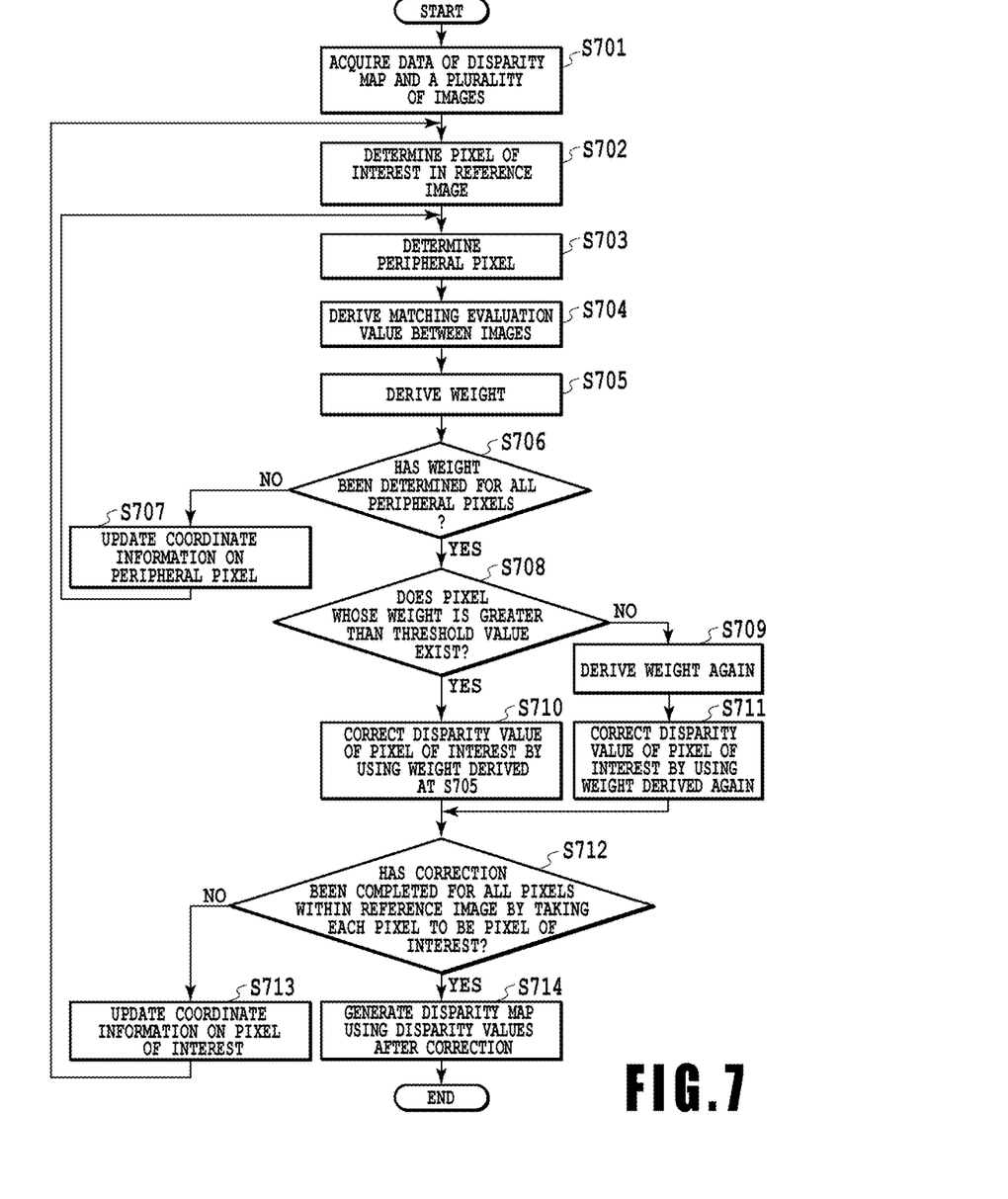
FIG. 7 is a flowchart showing a flow of correction processing of disparity map data according to the second embodiment.

FIG. 6 is a function block diagram showing a software configuration of the image processing apparatus 100 according to the present embodiment. In the case of the present embodiment, in addition to each unit shown in the function block diagram in FIG. 2, an evaluation value weight determination unit 601, a depth weight derivation unit 602, a color weight derivation unit 603, and a weight integration unit 604 are added newly. FIG. 7 is a flowchart showing a flow of correction processing capable of correcting a disparity map with a high accuracy even in an area where matching is not attained, such as an occlusion area, according to the present embodiment. Hereinafter, explanation is given with reference to FIG. 6 and FIG. 7.

Step 701 to step 707 are the same as steps 301 to 307 in the flow in FIG. 3 of the first embodiment, and therefore, explanation thereof is omitted.

In the case where the weight w is determined for all the pixels within a predetermined block (Yes at step 706), at step 708, the evaluation value weight determination unit 601 determines whether the peripheral pixel r whose value of the determined weight w is greater than a threshold value exists. This determination is performed for all the peripheral pixels r within the predetermined block. As the threshold value, mention is made of, for example, 0.2, but the threshold value is not limited to 0.2 and the threshold value only needs to be capable of determining an area in which matching is not attained successfully, such as an occlusion area. In the case where the peripheral pixel r whose value of the weight w is greater than the threshold value exists, the processing proceeds to step 710. On the other hand, in the case where the values of the weights determined for all the peripheral pixels within the predetermined block are smaller than the threshold value, the processing proceeds to step 709.

At step 709, the weight is derived again based on the difference in the pixel value (color) between the pixel of interest and the peripheral pixel and the depth in place of the matching evaluation value between the input images. Here, a case is explained where the weight is derived based on both the difference in color and the depth, that is, an aspect is explained in which each weight is derived by the depth weight derivation unit 602 and the color weight derivation unit 603 and the final weight is determined by the weight integration unit 604. Specifically, rederivation of weight is performed as follows.

First, in the depth weight derivation unit 602, a depth weight $w_d$ based on the depth from the pixel of interest p is found by using coordinate information on the peripheral pixel r. Here, the depth weight $w_d$ is expressed by expression (5) and expression (6) below.

$$w_d(p, r) = \exp\left\{-\frac{\|p-r\|_2^2}{2\sigma_d^2}\right\}$$ Expression (5)

$$\left\|\begin{pmatrix} x \\ y \end{pmatrix}\right\|_m^m = |x|^m + |y|^m$$ Expression (6)

In expression (5) described above, p and r are two-dimensional vectors corresponding to the coordinates of the pixel of interest p and the peripheral pixel r, respectively, and the value of the depth weight $w_d$ depends on the Euclidean depth between p and r. Further, $\sigma_d$ is a real constant that can be set arbitrarily and is a constant indicating the range of the peripheral pixel r that should be taken into consideration.

Then, in the color weight derivation unit 603, a color weight $w_{color}$ based on the difference in the pixel value (color) from the pixel of interest p is found by using the pixel values of the pixel of interest p and the peripheral pixel r stored in the RAM 102. Here, the color weight $w_{color}$ is expressed by expression (7) below.

$$w_{color}(p, r) = \exp\left\{-\frac{1}{3}\sum_{i=\{R,G,B\}}\frac{\|I_i(p) - I_i(r)\|_2^2}{2\sigma_i^2}\right\}$$ Expression (7)

In expression (7) described above, $I_i(p)$ and $I_i(r)$ are pixel values of the pixel of interest p and the peripheral pixel r, respectively, and i is a subscript representing color information on {R, G, B}. Then, it is assumed that Σ means acquisition of color information on three channels. Here, $\sigma_i$ is a parameter representing the variance of the pixel value of the coefficient distribution in the intensity direction. In the present embodiment, for all i={R, G, B}, $\sigma_i$=5/255 is set, but this value can be set freely like $\sigma_d$.

Then, in the weight integration unit 604, based on expression (8) below, the final weight is determined.

$$w(p,r) = w_{color}(p,r)w_d(p,r)$$ Expression (8)

At step 305 of the first embodiment, the weight of the peripheral pixel r is derived based on only the matching evaluation value. At step 705 of the present embodiment, it may also be possible to derive the product of the weight w that is found from the matching evaluation value and the depth weight $w_d$ that is found from expression (5) described above as the weight of the peripheral pixel r.

Further, at step 709 described above, the weight w is derived again based on the pixel values of the pixel of interest p and the peripheral pixel r and the depth, but it may also be possible to use another method, such as a method of finding a median by using a median filter.

Step 710 is the same as step 311 in the flow in FIG. 3 and the correction of the disparity value using the weight w derived based on the matching evaluation value is performed.

On the other hand, in the case where the weight w is derived again at step 709, the correction unit 206 performs, at step 711, the correction of the disparity value by using the new weight w that is derived again.

Step 712 to step 714 are the same as steps 309 to 311 in the flow in FIG. 3, and therefore, explanation thereof is omitted.

The above is the contents of the filter processing capable of correcting a disparity map with a high accuracy in an area where matching is not attained, such as an occlusion area, according to the present embodiment.

Figure 8:
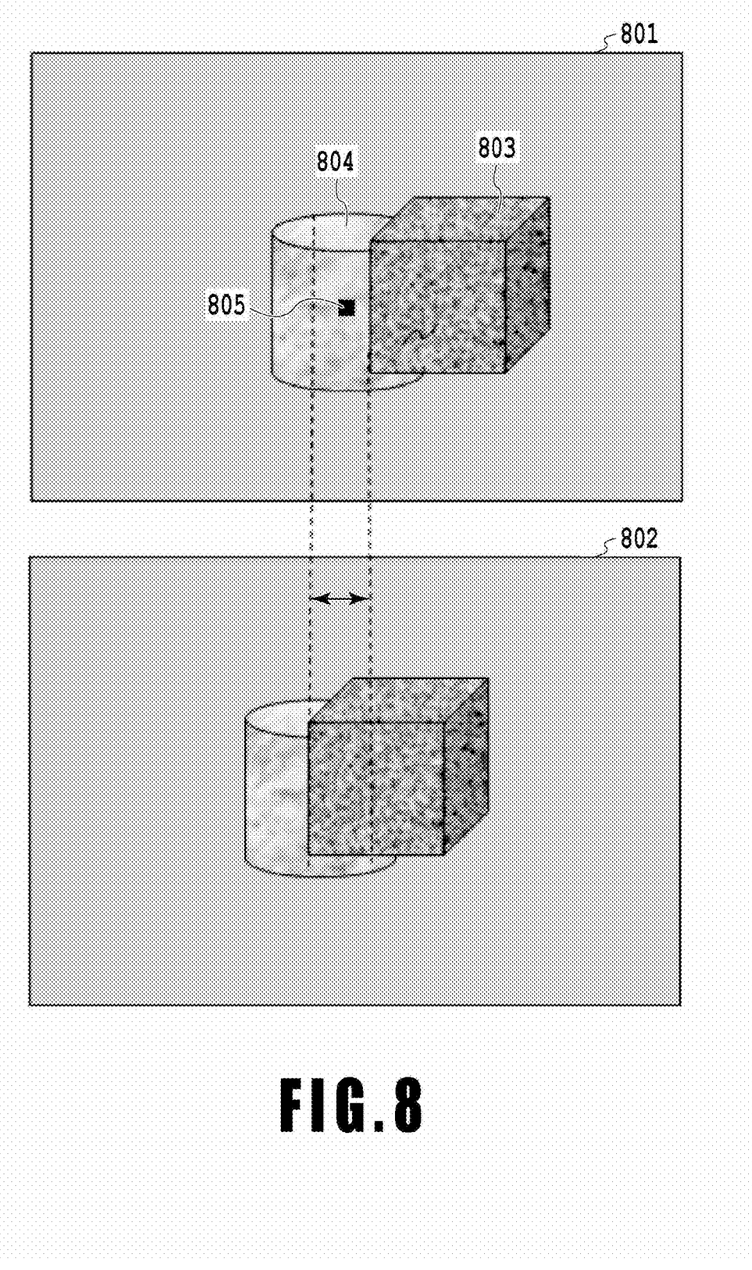
FIG. 8 is a diagram explaining rederivation of a weight in the second embodiment.

FIG. 8 is a diagram showing a case where the weight w is derived again by the determination at step 708. In FIG. 8, an image 801 is a left-viewpoint image and an image 802 is a right-viewpoint image, in both of which, two subjects, i.e., a cube 803 and a cylinder 804 are photographed, with the cube 803 being ahead of the cylinder 804. A pixel 805 is a pixel of interest and is photographed in the left-viewpoint image 801, but is not photographed in the right-viewpoint image 802 because of being hidden by the subject 803. In such an area (occlusion area), even by using any disparity value of the peripheral pixel, there is no corresponding point (pixel), and therefore, the matching evaluation value becomes large and the weight becomes small. Consequently, in the present embodiment, in the case where all the weights of the peripheral pixels are less than or equal to a threshold value, the weight is derived again based on the difference in the pixel value between the pixel of interest and the peripheral pixel and the depth and thus an appropriate weight is determined, and then, the correction of the disparity value is performed.

By performing the processing such as this, it is possible to correct a disparity map with a high accuracy even in an area where matching is not attained, such as an occlusion area.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to improve the disparity estimation accuracy while maintaining the edge of a subject in the filter processing of a disparity map and a depth map.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-141363, filed Jul. 15, 2015, which is hereby incorporated by reference wherein in its entirety.

What is claimed is:

1. An image processing apparatus that corrects a depth image representing information about a depth to a subject in a scene, which is the same scene of a plurality of images obtained by photographing the same subject from different viewpoints, the image processing apparatus comprising:
    a unit configured to determine a pixel of interest in a first image that is taken to be a reference among the plurality of images and peripheral pixels existing within a predetermined region according to the pixel of interest, the peripheral pixels being pixels for which a weight is to be derived;
    an evaluation value derivation unit configured to derive a matching evaluation value between the plurality of images for the respective peripheral pixels;
    a weight determination unit configured to determine a weight for the respective peripheral pixels in the correction based on the evaluation value; and
    a correction unit configured to correct a pixel value of the pixel of interest in the depth image by using the weight and a pixel value of the peripheral pixels,
    wherein the evaluation value derivation unit specifies, for each peripheral pixel, a pixel corresponding to the pixel of interest in a second image among the plurality of images, the second image being different from the first image, by using a depth of the respective peripheral pixels in the depth image and derives the matching evaluation value of each peripheral pixel based on the pixel value of the pixel of interest and the pixel value of the specified corresponding pixel.

2. The image processing apparatus according to claim 1, wherein
    the evaluation value represents similarity between pixel values of the pixel of interest and the specified corresponding pixels in the plurality of images.

3. The image processing apparatus according to claim 1, wherein the correction unit corrects pixel values of the pixels corresponding to an occlusion area in the plurality of images by using a weight different from the weight determined based on the evaluation value.

4. The image processing apparatus according to claim 3, wherein
    the weight different from the weight determined based on the evaluation value is derived based on at least one of a difference in color between the pixel of interest and the peripheral pixels and a depth between the pixel of interest and the peripheral pixels.

5. The image processing apparatus according to claim 1, wherein the depth image is a disparity map in which an amount of movement of the subject between the plurality of images is represented by a pixel value.

6. The image processing apparatus according to claim 1, wherein the depth image is a depth map in which a depth to the subject in the plurality of images is represented by a pixel value.

7. The image processing apparatus according to claim 1, wherein the evaluation value derivation unit acquires an amount of disparity corresponding to the peripheral pixel by referring to the depth of the peripheral pixel and specifies, as a corresponding pixel of the pixel of interest, a pixel at a position shifted from a position identical to the pixel position of the pixel of interest in the second image by the acquired amount of disparity corresponding to the peripheral pixel.

8. An image processing method of correcting a plurality of images obtained by photographing one and the same subject from different viewpoints and a depth image representing information about a depth to the subject in one and the same scene, the method comprising:
    determining a pixel of interest in a first image that is taken to be a reference among the plurality of images and peripheral pixels existing within a predetermined region according to the pixel of interest, the peripheral pixels being pixels for which a weight is to be derived;
    deriving a matching evaluation value between the plurality of images for the respective peripheral pixels;
    determining a weight for the respective peripheral pixels in the correction based on the evaluation value; and
    correcting a pixel value of the pixel of interest in the depth image by using the weight and a pixel value of the peripheral pixels,
    wherein, for each peripheral pixel, a pixel corresponding to the pixel of interest in a second image among the plurality of images is specified, the second image being different from the first image, by using a depth of the respective peripheral pixels in the depth image and the matching evaluation value of each peripheral pixel is derived based on the pixel value of the pixel of interest and the pixel value of the specified corresponding pixel.

9. A non-transitory computer readable storage medium storing a program for causing a computer to perform an image processing method of correcting a depth image representing information about a depth to a subject in a scene, which is the same scene of a plurality of images obtained by photographing the same subject from different viewpoints, the method comprising:
    determining a pixel of interest in a first image that is taken to be a reference among the plurality of images and peripheral pixels existing within a predetermined region according to the pixel of interest, the peripheral pixels being pixels for which a weight is to be derived;
    deriving a matching evaluation value between the plurality of images for the respective peripheral pixels;
    determining a weight for the respective peripheral pixels in the correction based on the evaluation value; and
    correcting a pixel value of the pixel of interest in the depth image by using the weight and a pixel value of the peripheral pixels,
    wherein, for each peripheral pixel, a pixel corresponding to the pixel of interest in a second image among the plurality of images is specified, the second image being different from the first image, by using a depth of the respective peripheral pixels in the depth image and the matching evaluation value of each peripheral pixel is derived based on the pixel value of the pixel of interest and the pixel value of the specified corresponding pixel.

* * * * *